(12) United States Patent
Kobrosly et al.

(10) Patent No.: US 7,487,406 B2
(45) Date of Patent: Feb. 3, 2009

(54) SYSTEMS, METHODS, AND MEDIA FOR MANAGING SOFTWARE DEFECTS

(75) Inventors: Walid Kobrosly, Round Rock, TX (US); Nadeem Malik, Austin, TX (US); Steven L. Roberts, Cedar Park, TX (US); Michael E. Weissinger, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 472 days.

(21) Appl. No.: 11/289,042

(22) Filed: Nov. 29, 2005

(65) Prior Publication Data

US 2007/0168757 A1    Jul. 19, 2007

(51) Int. Cl.
*G06F 11/00* (2006.01)
(52) U.S. Cl. .............................. 714/49; 714/26; 714/28; 714/29
(58) Field of Classification Search .................. 714/26, 714/28, 29, 49
See application file for complete search history.

(56) References Cited

U.S. PATENT DOCUMENTS

| | | | |
|---|---|---|---|
| 5,590,056 A * | 12/1996 | Barritz | 702/186 |
| 7,343,523 B2 * | 3/2008 | Cheong et al. | 714/38 |
| 2004/0249914 A1 * | 12/2004 | Flocken et al. | 709/223 |
| 2005/0076052 A1 * | 4/2005 | Kojima | 707/102 |
| 2005/0210331 A1 * | 9/2005 | Connelly et al. | 714/26 |
| 2006/0184829 A1 * | 8/2006 | Cheong et al. | 714/39 |

* cited by examiner

*Primary Examiner*—Robert Beausoliel
*Assistant Examiner*—Charles Ehne
(74) *Attorney, Agent, or Firm*—Mark E. McBurney; Schubert Osterrieder & Nickelson PLLC (57) ABSTRACT

Systems, methods and media for managing software defects by aggregating potential software defect information from a plurality of user computer systems are disclosed. Embodiments may include receiving a plurality of software state logs each from an originating user computer system, where each software state log is associated with a potential software defect of an application executing on its originating user computer system and each software state log includes software state information associated with its originating user computer system. Embodiments may also include storing the received software state logs in a defect repository and analyzing the software state information of the stored software state logs to detect patterns in the software state information. Further embodiments may include verifying that a potential software defect associated with a software state log is a defect and transmitting a verification of the software defect to the particular user computer system.

18 Claims, 6 Drawing Sheets

SYSTEMS, METHODS, AND MEDIA FOR MANAGING SOFTWARE DEFECTS

FIELD OF INVENTION

The present invention is in the field of data processing systems and, in particular, to systems, methods and media for managing software defects such as by aggregating and analyzing defect information from a plurality of user computer systems.

BACKGROUND

Personal computer systems are well known in the art. They have attained widespread use for providing computer power to many segments of today's modem society. Personal computers (PCs) may be defined as a desktop, floor standing, or portable microcomputer that includes a system unit having a central processing unit (CPU) and associated volatile and non-volatile memory, including random access memory (RAM) and basic input/output system read only memory (BIOS ROM), a system monitor, a keyboard, one or more flexible diskette drives, a CD-ROM or DVD-ROM drive, a fixed disk storage drive (also known as a "hard drive"), a pointing device such as a mouse, and an optional network interface adapter. One of the distinguishing characteristics of these systems is the use of a motherboard or system planar to electrically connect these components together. The use of mobile computing devices, such as notebook PCs, personal digital assistants (PDAs), sophisticated wireless phones, etc., has also become widespread. The widespread use of PCs and mobile computing devices in various segments of society has resulted in a reliance on computer systems both at work and at home, such as for telecommuting, news, stock market information and trading, banking, shopping, shipping, communication in the form of hypertext transfer protocol (http) and e-mail, as well as other services. Many of these functions take advantage of the communication abilities offered by the Internet or other networks, such as local area networks.

As software used with PCs and mobile computer devices is used for more and more functions and increases in utility, it has become increasingly complex. Because of the complexity of modern operating systems and software applications, users are often unable to diagnose problems, or defects, in their software. When a problem with their software occurs, users typically do not know what caused the problem or how it can be fixed and are instead presented with a cryptic error message at best. Even when the user identifies a potential software defect, the user typically cannot effectively inform interested parties of a potential software defect. Users similarly cannot efficiently verify that the potential defect is an actual defect, inform others of the prevalence of the defect, or provide sufficient information to recreate or diagnose the defect. Many software defects accordingly go unreported and are not diagnosed in a timely fashion.

One solution to the problem of software defects is for the software application under use to have a handler for when it reaches a particular failing state that results in termination of execution of the software. These software applications transmit a notification of the state to the creator of the software application when the software reaches the handler, if the user agrees to the transmittal. Such a solution, however, has a number of drawbacks. First, this solution does not capture a complete failing state of the operating system (OS) on which the software is executing, instead providing information only when the application itself reaches a particular point. The failing state of the OS prevents the proper operation of the handler. The solution also fails to allow a user to voluntarily submit a state or potential defect (that does not satisfy the handler) to verify whether it is an actual defect. In addition, the solution only handles states that cause the application to terminate in a particular way, failing to handle other states that do not trigger the handler. Moreover, this solution fails to recognize the role played by multiple, interacting applications that may cause errors as a result of their interaction. There is, therefore, a need for an efficient and effective system to manage software defects.

SUMMARY OF THE INVENTION

The problems identified above are in large part addressed by systems, methods and media for managing software defects. One embodiment provides a method of managing software defects. The embodiment may include receiving a plurality of software state logs each from an originating user computer system, where each software state log is associated with a potential software defect of an application executing on its originating user computer system and each software state log includes software state information associated with its originating user computer system. Embodiments may also include storing the received software state logs in a defect repository and analyzing the software state information of the stored software state logs to detect patterns in the software state information. Further embodiments may include verifying that a potential software defect associated with a software state log is a defect and transmitting a verification of the software defect to its originating user computer system.

Another embodiment provides a machine-accessible medium containing instructions effective, when executing in a data processing system, to cause the system to perform a series of operations for managing software defects. Embodiments generally include a series of operations for receiving a plurality of software state logs each from an originating user computer system, where each software state log is associated with a potential software defect of an application executing on its originating user computer system and each software state log includes software state information associated with its originating user computer system. Embodiments may also include a series of operations for storing the received software state logs in a defect repository and for analyzing the software state information of the stored software state logs to detect patterns in the software state information. Further embodiments may include a series of operations for verifying that a potential software defect associated with a software state log is a defect and transmitting a verification of the software defect to its originating user computer system.

A further embodiment provides a defect repository server. The defect repository server may generally include a communications module to receive a plurality of software state logs from a plurality of originating user computer systems, where each software state log is associated with a potential software defect of an application executing on its originating user computer systems. Each software state log may also include software state information associated with its originating user computer system. The defect repository server may also generally include a defect repository interface to store the received software state logs in a defect repository and a defect analyzer module to analyze the software state logs stored in the defect repository to detect patterns in the software state information. The defect repository server may also generally include a defect notification module to transmit an indication of detected patterns in the software state information.

BRIEF DESCRIPTION OF THE DRAWINGS

Advantages of the invention will become apparent upon reading the following detailed description and upon reference to the accompanying drawings in which like references may indicate similar elements.

DETAILED DESCRIPTION OF EMBODIMENTS

The following is a detailed description of example embodiments of the invention depicted in the accompanying drawings. The example embodiments are in such detail as to clearly communicate the invention. However, the amount of detail offered is not intended to limit the anticipated variations of embodiments; on the contrary, the intention is to cover all modifications, equivalents, and alternatives falling within the spirit and scope of the present invention as defined by the appended claims. The descriptions below are designed to make such embodiments obvious to a person of ordinary skill in the art.

Generally speaking, systems, methods and media for managing software defects by aggregating potential software defect information from a plurality of user computer systems are disclosed. Embodiments may include receiving a plurality of software state logs each from an originating user computer system, where each software state log is associated with a potential software defect of an application executing on its originating user computer system and each software state log includes software state information associated with its originating user computer system. Embodiments may also include storing the received software state logs in a defect repository and analyzing the software state information of the stored software state logs to detect patterns in the software state information. Further embodiments may include verifying that a potential software defect associated with a software state log is a defect and transmitting a verification of the software defect to its originating user computer system.

The system and methodology of the disclosed embodiments provides for managing software defects by aggregating and analyzing software defect information from a plurality of user computer systems. By collecting software state information relating to a plurality of potential software defects for multiple users, a defect repository may be advantageously created and populated. The defect repository may be sorted and analyzed to detect patterns in the stored software state information, such as a pattern of operating system (OS) system calls or input/output (I/O) in the OS prior to software defects occurring. These detected patterns may provide an indication of whether a potential defect is an actual defect, interoperability problems between applications, or insight into the cause of a defect. In some embodiments, users who provide input to the defect repository may receive a verification that their software was subject to an actual defect. Information from the defect repository may also be sent to third parties, such as software developers, who desire information about defects in a piece of software or in the combination of multiple software applications. The disclosed systems accordingly provide an effective and efficient methodology for managing software defects.

While specific embodiments will be described below with reference to particular configurations of hardware and/or software, those of skill in the art will realize that embodiments of the present invention may advantageously be implemented with other substantially equivalent hardware and/or software systems. Aspects of the invention described herein may be stored or distributed on computer-readable media, including magnetic and optically readable and removable computer disks, as well as distributed electronically over the Internet or over other networks, including wireless networks. Data structures and transmission of data (including wireless transmission) particular to aspects of the invention are also encompassed within the scope of the invention.

Figure 1:
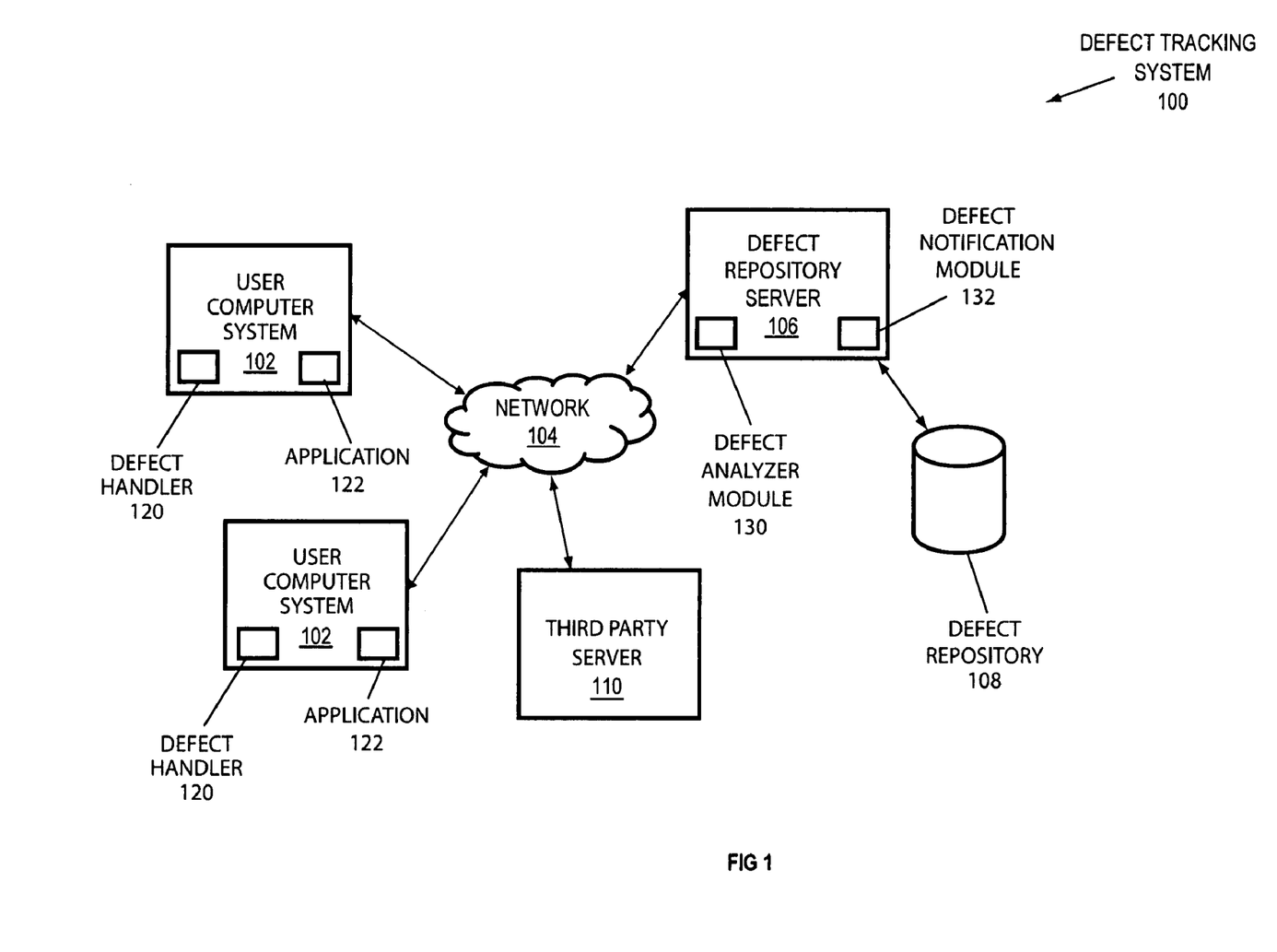
FIG. 1 depicts an environment for a defect tracking system for managing software defect information from multiple users according to one embodiment.

Turning now to the drawings, FIG. 1 depicts an environment for a defect tracking system for managing software defect information from multiple users according to one embodiment. In the depicted embodiment, the defect tracking system 100 includes a plurality of user computer systems 102 in communication with a network 104. A defect repository server 106 with a defect repository 108 may be in communication with the user computer system 102 via network 104. As will be described in more detail subsequently, the defect repository server 106 may receive information relating to potential software defects from the user computer systems 102 and store such information for analysis in the defect repository 108. The defect tracking system 100 may also include an optional third party server 110 in communication with network 104. In some embodiments, the defect repository server 106 may transmit the results of software defect analysis to third party servers 110, such as when owners of the third party server 110 have subscribed to such a service. Software defects, as used herein, may include failures of software as well as glitches or other inconsistencies in the execution of software on a user computer system 102.

In the defect tracking system 100, the user computer systems 102, the defect repository server 106, the defect repository 108, and/or any third party servers 110 may be located at the same location, such as in the same building or computer lab, or could be remote. While the term "remote" is used with reference to the distance between the components of the defect tracking system 100, the term is used in the sense of indicating separation of some sort, rather than in the sense of indicating a large physical distance between the systems. For example, any of the components of the defect tracking system 100 may be physically adjacent or located as part of the same computer system in some network arrangements.

Each user computer system 102 may be any computer system adapted to execute one or more software applications 122. Applications 122 may be any software program adapted to execute on a user computer system 102, such as word processors, spreadsheets, image processing programs, games, operating systems, utilities, browsers, e-mail managers, or other programs. A user computer system 102 may include one or more personal computers, workstations, servers, mainframe computers, notebook or laptop computers, desktop computers, PDAs, set-top boxes, mobile phones, wireless devices, or the like. In some embodiments, the user computer system 102 may be a computer system as described in relation to FIG. 2. A user computer system 102 may be in wired or wireless communication with network 104 so that it may communicate with the defect repository server 106 via network 104. Each user computer system 102 may include a defect handler 120, which may be a software application that provides for detecting a potential software defect, transmitting an indication of the defect to the defect repository server 106, and optionally receipt of verification of the defect from the defect repository server 106. The operation of defect handler 120, as well as the user computer system 102 itself, is described in more detail in relation to FIG. 3.

Network 104 may be any type of data communications channel, or any combination of data communication channels, such as the Internet, an intranet, a local area network (LAN), a wide area network (WAN), an Ethernet network, a wireless network, a proprietary network, or a broadband cable network. In some embodiments, network 104 may be the Internet and user computer systems 102 and the defect tracking server 106 may have a permanent or temporary connection to the Internet. Those skilled in the art will recognize, however, that the invention described herein may be implemented utilizing any type or combination of data communications channel(s).

The defect repository server 106 may be executing on one or more personal computers, workstations, servers, mainframe computers, notebook or laptop computers, desktop computers, or the like. In some embodiments, the defect repository server 106 may be a computer system as described in relation to FIG. 2. An example defect repository server 106 is an International Business Machine Corporation (IBM) eServer® server. The defect repository server 106, which is described in more detail in relation to FIG. 4, may receive notifications of possible software defects from user computer systems 102 and store such notifications in the defect repository 108 for analysis, sorting, or other processing. The defect repository 108 may be any type of database for storage of information and may be located as part of the defect repository server 106 or as local storage to the defect repository server 106. Alternatively, the defect repository 108 may be remote from the defect repository server 106 and be accessible via a network 104, such as the Internet or a LAN.

In the depicted embodiment, the defect repository server 106 includes a defect analyzer module 130 and a defect notification module 132. The defect analyzer module 130, as described in more detail in relation to FIG. 4, may analyze the information stored in the defect repository 108 to detect patterns in the data. The results of such analysis may include verification that a potential defect actually is a defect, an indication of an OS system call or I/O pattern occurring before a defect that might indicate the cause of the defect, a correlation between simultaneous operation of two or more programs and a defect, or any other result. The defect notification module 132 may then notify a user or third party of the detected patterns (i.e., the results of the analysis). The defect notification module 132 may, for example, transmit a verification of a software defect to a particular user who submitted the defect as a potential software defect. To do so, the defect repository server 106 may transmit the verification to the originating user computer system 102. In another example, the defect notification module 132 may transmit an indication of defect patterns to a third party, such as the software developer for the software for which the defect is occurring. The defect repository 108 and the analysis of its content may thus provide commercial value to users, third parties, or others who may find defect patterns of interest.

As discussed previously, the defect tracking system 100 may also include one or more third party servers 110 in communication with network 104. Any third party servers 110 may be executing on one or more personal computers, workstations, servers, mainframe computers, notebook or laptop computers, desktop computers, or the like. In some embodiments, the third party server 110 may be a computer system as described in relation to FIG. 2. The third party server 110 may represent any recipient of analysis or patterns from the defect repository server 106, such as software developers or manufacturers. In some embodiments, the third party server 110 may only receive information from the defect repository server 106 if the third party server 110 registers for such a service (e.g., by paying a subscription fee).

The disclosed system may provide an opportunity for revenue for the owner of the defect repository server 106 in a number of ways. In some embodiments, the owner may charge users of a user computer system 102 a subscription or one-time fee for submitting a potential defect and receiving verification. Alternatively, users may be granted free use of the defect tracking system 100 in exchange for their participation. In other embodiments, the owner may charge third parties for the results of the analysis. The owner may charge a fixed fee, subscription fee, a fee per application 122, or any other fee methodology to provide such results to interested third parties. Interested third parties may include software developers, OS developers, utility developers, or any other entities.

Figure 2:
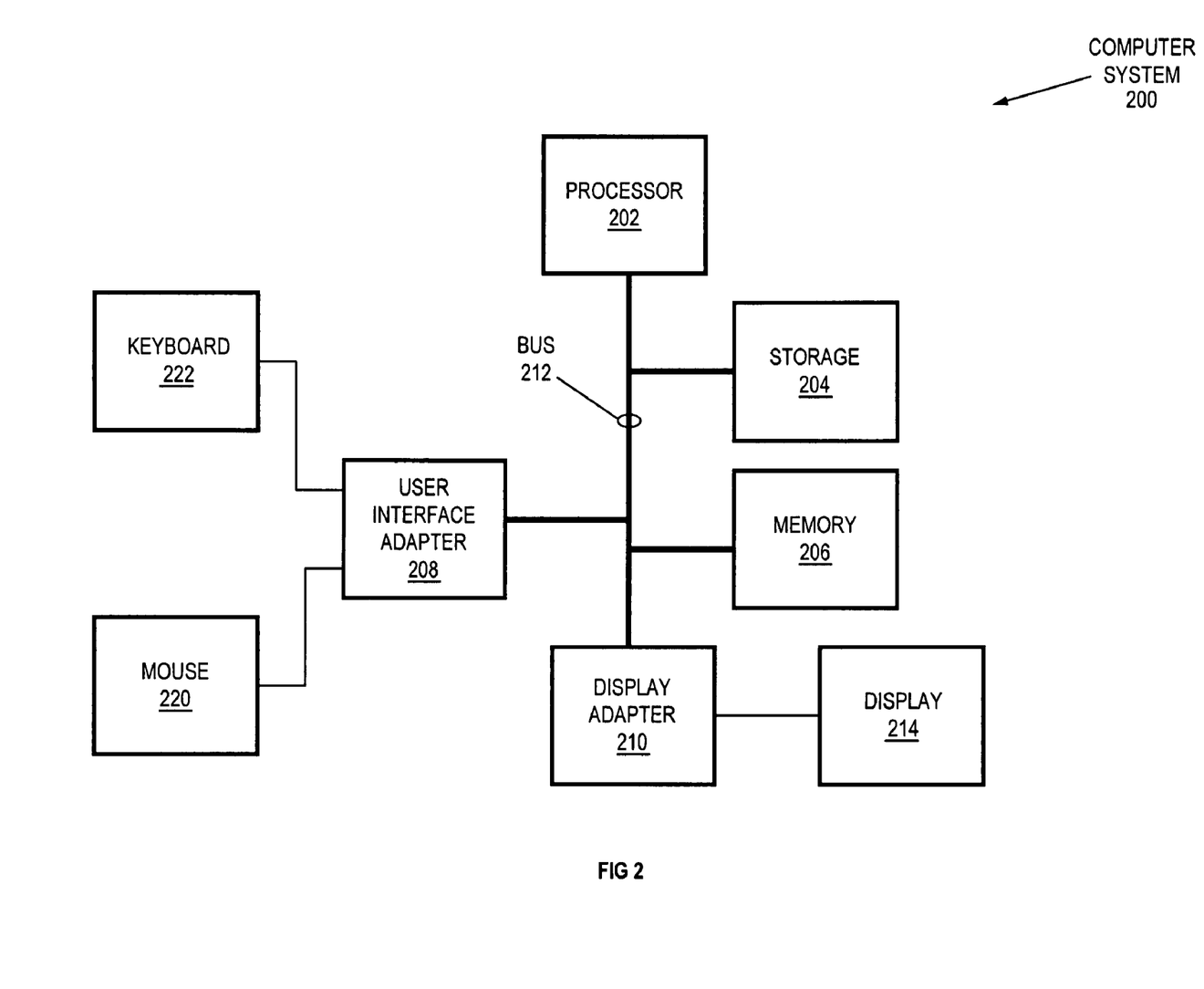
FIG. 2 depicts a block diagram of one embodiment of a computer system suitable for use as a component of the defect tracking system, such as a user computer system, defect repository server, or third party server.

FIG. 2 depicts a block diagram of one embodiment of a computer system 200 suitable for use as a component of the defect tracking system 100, such as a user computer system 102, defect repository server 106, or third party server 110. Other possibilities for the computer system 200 are possible, including a computer having capabilities other than those ascribed herein and possibly beyond those capabilities, and they may, in other embodiments, be any combination of processing devices such as workstations, servers, mainframe computers, notebook or laptop computers, desktop computers, PDAs, mobile phones, wireless devices, set-top boxes, or the like. At least certain of the components of computer system 200 may be mounted on a multi-layer planar or motherboard (which may itself be mounted on the chassis) to provide a means for electrically interconnecting the components of the computer system 200.

In the depicted embodiment, the computer system 200 includes a processor 202, storage 204, memory 206, a user interface adapter 208, and a display adapter 210 connected to a bus 214. The bus 214 facilitates communication between the processor 202 and other components of the computer system 200, as well as communication between components. Processor 202 may include one or more system central processing units (CPUs) or processors to execute instructions, such as an IBM® PowerPC™ processor, an Intel Pentium® processor, an Advanced Micro Devices Inc. processor or any other suitable processor. Software such as applications 122 of the user computer system 102 may execute on processor 202. The processor 202 may utilize storage 204, which may be non-volatile storage such as one or more hard drives, tape drives, diskette drives, CD-ROM drive, DVD-ROM drive, or the like. In one embodiment, the defect repository 108 may be stored as a database on storage 204. The processor 202 may also be connected to memory 206 via bus 212, such as via a memory controller hub (MCH). System memory 206 may include volatile memory such as random access memory (RAM) or double data rate (DDR) synchronous dynamic random access memory (SDRAM).

The user interface adapter 208 may connect the processor 202 with user interface devices such as a mouse 220 or keyboard 222. The user interface adapter 208 may also connect with other types of user input devices, such as touch pads, touch sensitive screens, electronic pens, microphones, etc. The bus 212 may also connect the processor 202 to a display, such as an LCD display or CRT monitor, via the display adapter 210.

Figure 3:
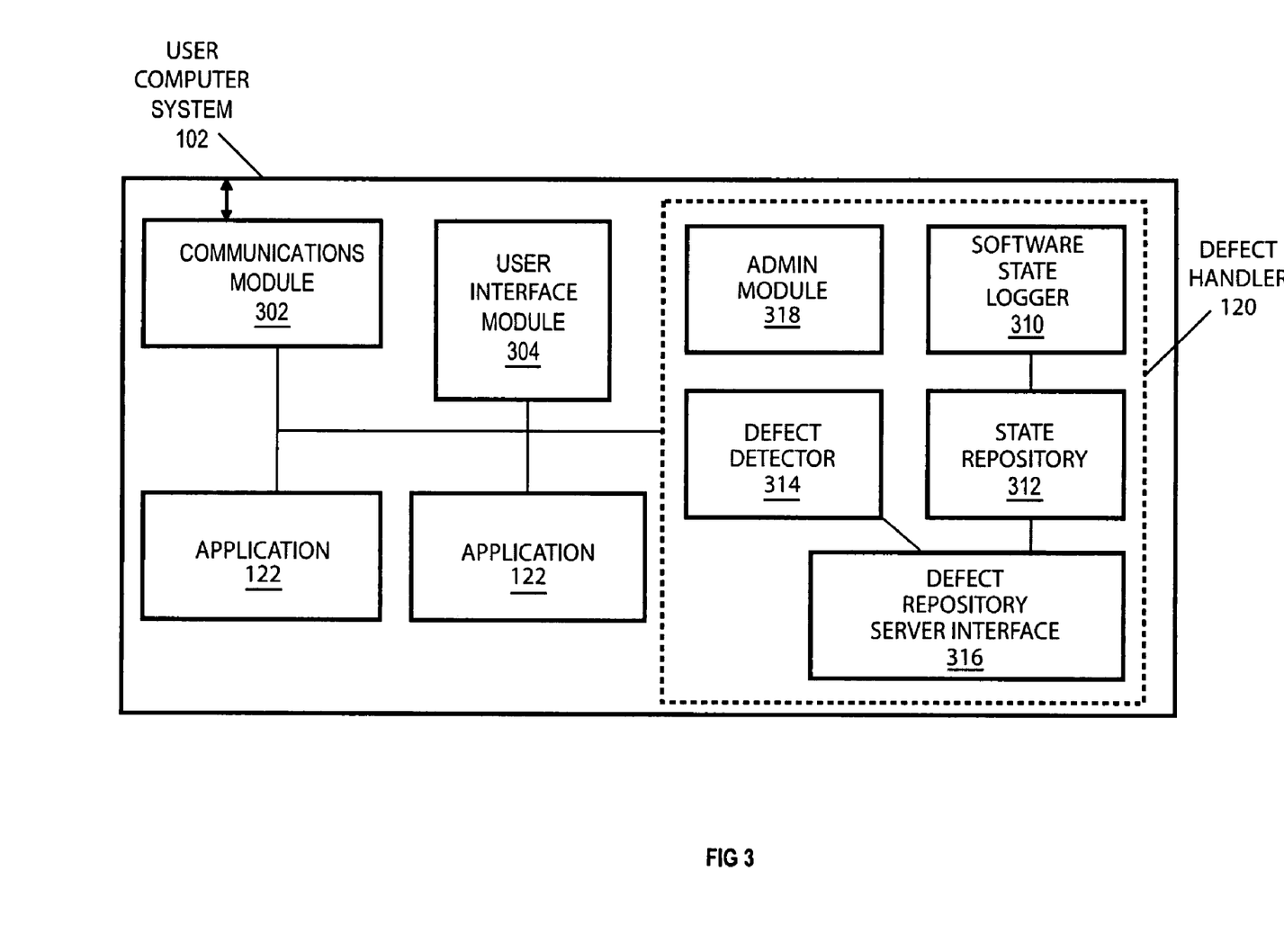
FIG. 3 depicts a conceptual illustration of software components of a user computer system of the defect tracking system according to one embodiment.

FIG. 3 depicts a conceptual illustration of software components of a user computer system 102 of the defect tracking system 100 according to one embodiment. The user computer system 102 of the depicted embodiment includes a plurality of applications 122, a defect handler 120, a communications module 302, and a user interface module 304. The communications module 302 may facilitate communications to and from the defect repository server 106 and other components of the defect tracking system 100. The user interface module 304 may receive user input from user input devices such as a mouse 220 or keyboard 222 and may transmit an indication of the received input to other components of the user computer system 102.

The defect handler 120 may include sub-modules such as a software state logger 310, a state repository 312, a defect detector 314, a defect repository server interface 316, and an administration module 318 to perform its tasks. The software state logger 310 may log information about the state of particular applications 122 and/or the OS of the user computer system 102 during execution of one or more applications 122. The software state logger 310 may save the logged information in the state repository 312. In some embodiments, the software state logger 310 may log software state information continuously so that, in the event of a software defect or failure of the OS, the state of the application 122 and user computer system 102 prior to the defect is logged. Software state information may include one or more of OS system calls, an indication of I/O in the OS, operating system information (e.g., version, settings), user settings, user preferences, application information (e.g., version, settings), or other information that may indicate the state of the user computer system 102 and its software. Software state information may be related to a particular time or period of time, and the accumulation of software state information in the state repository 312 may be known as the software state log. The software state log may include all software state information since activation of the defect tracking system 100 or a subset thereof. The software state log may include other information, such as an identification of the user computer system 102 or user. The software state logger 310 may utilize any method to log the state of the software, including using trace capabilities of the OS (e.g., the Linux 'strace' command), having an input logger that logs all I/O on the OS (e.g., a keystroke logger), or using other technologies.

The defect detector 314 may detect the occurrence of a defect, or potential detect, in an application 122. In some embodiments, the defect detector 314 may determine that a defect has occurred by action of a software handler that his hit when an application 122 reaches a fail state. Alternatively the defect detector 314 may determine that a defect has occurred when a handler detects a state less severe than a fail state. In other embodiments, the defect detector 314 may determine that a defect (or potential defect) has occurred when a user requests that the software state be captured, which may occur when, for example, the user notices a problem in execution of an application 122. If a defect occurs that crashes the entire OS, the defect detector 314 may determine that an application 122 defect occurred in some embodiments. In the event of a system crash, the software state log may still be intact for transmission to the a defect repository server 106.

When a defect is detected by the defect detector 314, the defect repository server interface 316 may transmit an indication of the software state log stored in the state repository 312 and transmit it to the defect repository server 106 for processing. The defect repository server interface 316 may include other information as well, including an indication of the user computer system 102, authentication information (i.e., user id and password), or other information. The defect repository server interface 316 may also receive information from the defect repository server 106, such as verification that a potential software defect actually is a defect. The administration module 318 may facilitate configuration of the defect handler 120 by a user via user interface module 304, such as by allowing a user to change preferences, etc., on the operation of the defect handler 120.

Figure 4:
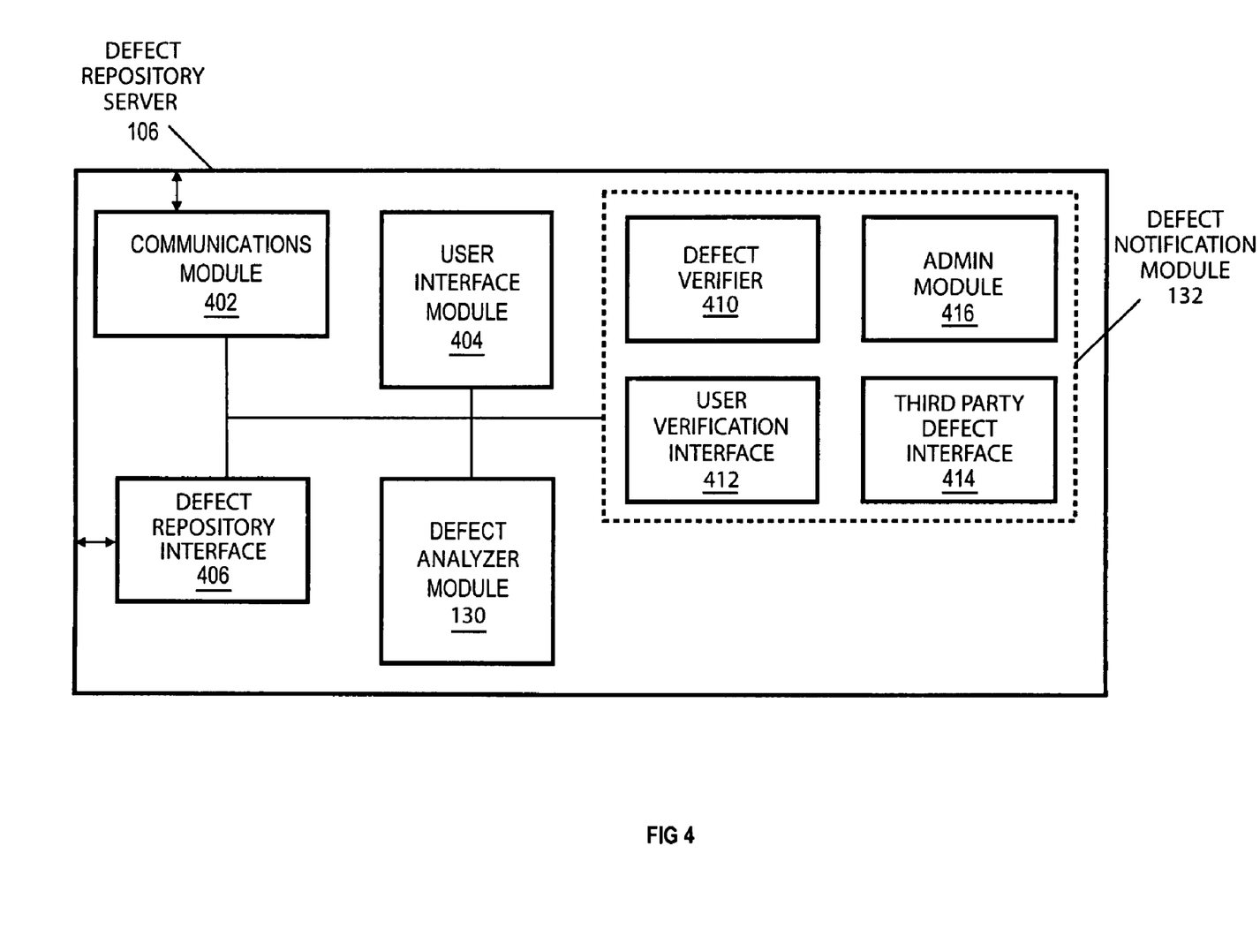
FIG. 4 depicts a conceptual illustration of software components of a defect repository server of the defect tracking system according to one embodiment.

FIG. 4 depicts a conceptual illustration of software components of a defect repository server 106 of the defect tracking system 100 according to one embodiment. The defect repository server 106 of the depicted embodiment includes a defect analyzer module 130, a defect notification module 132, a communications module 402, a user interface module 404, and a defect repository interface 406. The defect analyzer module 130 and defect notification module 132 were described in relation to FIG. 1 and the description will not be repeated in the interest of brevity. The communications module 402 may facilitate communications to and from the user computer systems 102 and/or third party servers 110. The user interface module 304 may receive user input from user input devices such as a mouse 220 or keyboard 222 and may transmit an indication of the received input to other components of the defect repository server 106. The defect repository interface 406 may serve as the interface between components of the defect repository server 106 and the defect repository 108.

The defect notification module 132 may include sub-modules such as a defect verifier 410, a user verification interface 412, a third party defect interface 414, and an administration module 416 to perform its tasks. The defect verifier 410 may, in conjunction with the defect analyzer module 130, verify that a potential software defect received from an originating user computer system 102 is an actual defect upon user request. The defect verifier 410 may verify a defect by, for example, comparing the defect to the occurrence of a similar defect in other user computer systems 102. To accomplish this, the detect verifier 410 may accordingly collaborate with the defect analyzer module 130 to sort and analyze the data in the defect repository 108. The defect verifier 410 may determine that a defect is verified, for example, by determining (based on its associated software state information) that it occurred under similar conditions to a known defect. Once a determination is made whether a potential software defect actually is a defect, the user verification interface 412 may transmit a verification of the software defect to the user computer system 102 requesting verification.

Once analysis of the software state information in the defect repository 108 has been made by the defect analyzer module 130, the third party defect interface 414 may generate an application-specific report (i.e., specific to the application 122 with the defect) based on the detected pattern and transmit the defect report to a third party server 110. The defect report may be sent to any interested (and authorized) party, including a software developer who signs up for the service for their application 122. Other interested parties may include those with an interest in similar or related applications 122, those considering purchase of the application 122, those with their own application 122 which may conflict with the defective one, etc. The administration module 416 may facilitate configuration of the defect repository server 106 by an administrator via user interface module 404, such as by allowing the administrator to configure the defect notification module 132, manage the defect repository 108, modify the list of third party servers 110, etc.

Figure 5:
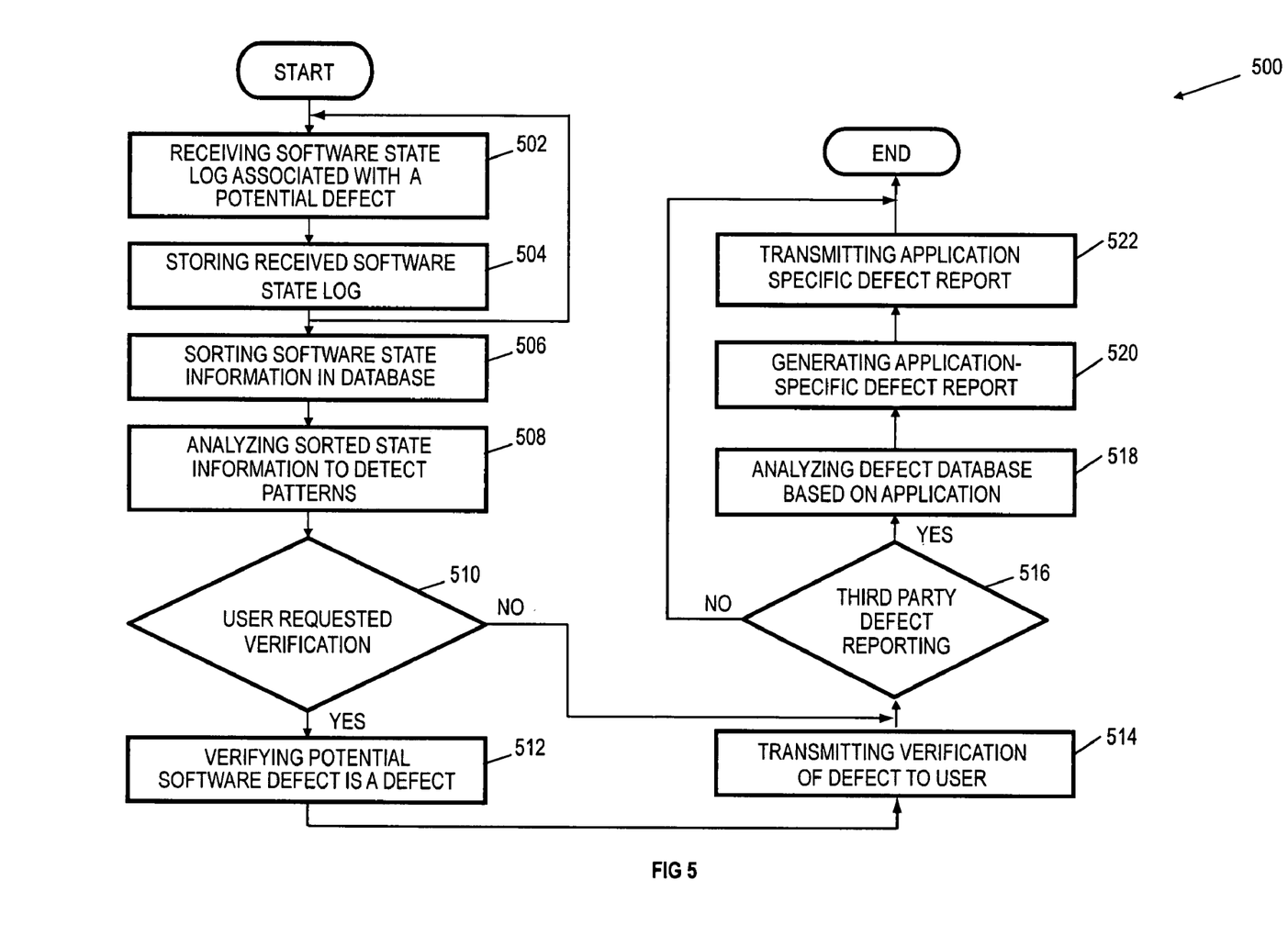
FIG. 5 depicts an example of a flow chart for receiving software state logs, analyzing sorted state information, and transmitting an indication of the analysis according to one embodiment.

FIG. 5 depicts an example of a flow chart 500 for receiving software state logs, analyzing sorted state information, and transmitting an indication of the analysis according to one embodiment. The method of flow chart 500 may be performed, in one embodiment, by components of a defect repository server 106 such as the defect analyzer module 130 and the defect notification module 132. Flow chart 500 begins with element 502, where the defect repository server 106 receives a software state log from a user computer system 102. The software state log may be associated with a potential software defect of an application 122 of the user computer system 102. The defect repository interface 406 may then store all or part of the received software state log in the defect repository at element 504. As more software state logs are received, elements 502 and 504 may be repeated.

The defect analyzer module 130 of the defect repository server 106 may sort the software state information in the defect repository 108 at element 506 and analyze the sorted state information to detect any patterns at element 508. The defect analyzer module 130 may perform elements 506 and 508 upon receiving a request for results of the analysis, on a set schedule or at a predefined time, upon request of an administrator, upon receiving a certain amount of new software state information, or upon other impetus. The detected patterns may include patterns of OS system calls prior to the defect, patterns of I/O in the OS prior to the defect, or other patterns that may indicate the nature of the defect. The disclosed methodology may also detect a pattern in a relationship between two applications 122 (i.e., their interaction is causing a defect), a pattern in the use of an application 122 with a particular version of an OS, or other patterns. One skilled in the art will recognize that the defect analyzer module 130 may sort and analyze the software state information in any fashion to detect any type of patterns in the data.

The defect repository server 106 may at decision block 510 determine that the user requested verification that a potential defect is actually a defect, such as based on the information received from a user computer system 102. If the user did request verification, the method of flow chart 500 may continue to element 512, where the defect verifier 410 may verify that the potential software defect actually is a defect. The method of flow chart 500 may then continue to element 514, where the user verification interface 412 transmits a verification of the defect to the user on the originating user computer system 102 via network 104.

The defect repository server 106 may at decision block 516 determine that a third party should be sent a defect report, such as when a third party has requested such a report. If a third party is to receive a defect report, the method of flow chart 500 continues to element 518, where the defect analyzer module 130 may analyze the software state information in the defect repository 108 based on the particular application 122 for which the defect report is being based upon. The defect analyzer module 130 may, for example, analyze the software state information for patterns that cause a particular type of failure in a specified application 122. After completing the analysis, flow chart 500 continues to element 520, where the third party defect interface 414 generates a defect report for the application 122. The third party defect interface 414 may then transmit the defect report to the appropriate third party server 110 at element 522, after which the method of flow chart 500 terminates.

Figure 6:
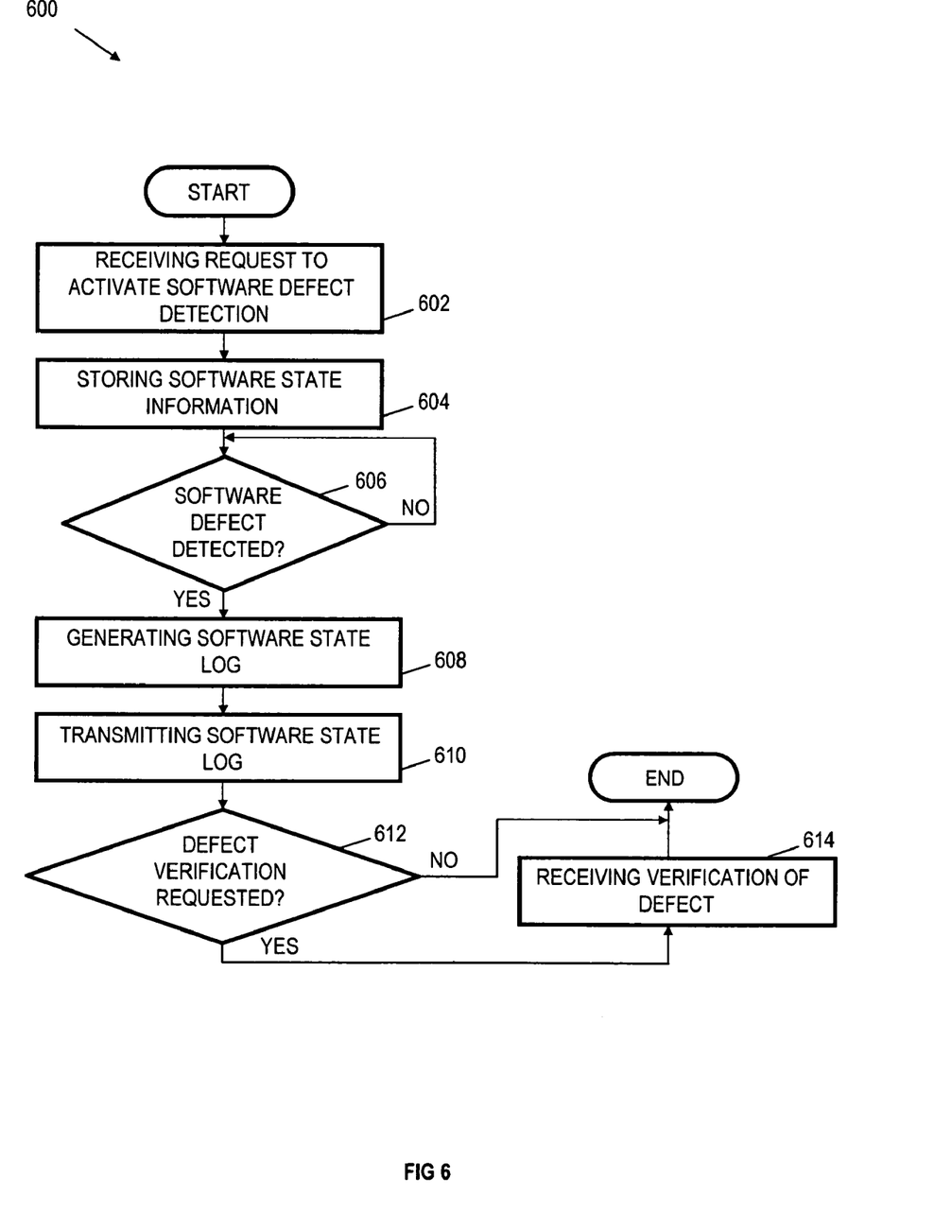
FIG. 6 depicts an example of a flow chart for requesting and receiving verification of a software defect according to one embodiment.

FIG. 6 depicts an example of a flow chart 600 for requesting and receiving verification of a software defect according to one embodiment. The method of flow chart 600 may be performed, in one embodiment, by components of a user computer system 102 such as a defect handler 120 and its sub-modules. Flow chart 600 begins with element 602, where the defect handler 120 and its administration module 318 receive a request to begin software defect detection. The user may request to activate detection through inputs of the user interface module 304 in some embodiments. Alternatively, software defect detection may be turned on automatically or by default. Once defect detection is activated, the software state logger 310 may store software state information in the state repository 312 at element 604.

At decision block 606, the defect detector 314 may determine if a software defect, or potential software defect, has occurred for one of the applications 122. As described previously, the defect detector 314 may determine a defect has occurred based on user input, a hit of a software handler, or other means. The defect detector 314 may continuously await the detection of a software defect once it is activated. Once a defect has been detected, the method of flow chart 600 continues to element 608, where the software state logger 310 generates a software state log based on the stored software state information. The software state log may include, for example, software state information for the time immediately preceding the detection of the defect and may alternatively include software state information for a plurality of times. The software state log may include, for example, software state information for the five minutes (or thirty cycles, etc.) preceding the defect. The defect repository server interface 316 may then, at element 610, transmit the software state log to the defect repository server 106 via network 104, thus allowing its user computer system 102 to serve as an originating user computer system 102. The defect repository server interface 316 may optionally include a request for verification of the software defect, authentication information, or other information with its transmission.

If, at decision block 612, the method of flow chart 600 determines that defect verification was requested, the method of flow chart 600 continues to element 614, where the user computer system 102 receives verification of the defect; otherwise, the flow chart terminates. The user computer system 102 may optionally display an indication of the verification to the user. As described previously, the user in some embodiments may only receive verification that their defect was real if they have registered or otherwise been authorized.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, systems, and media for managing software defects. It is understood that the form of the invention shown and described in the detailed description and the drawings are to be taken merely as examples. It is intended that the following claims be interpreted broadly to embrace all the variations of the example embodiments disclosed.

What is claimed is:

1. A method for managing software defects, the method comprising:

receiving, by a defect repository server from a plurality of originating user computer systems, a plurality of software state logs each from an originating user computer system, each software state log being associated with a potential software defect of an application executing on its originating user computer system, and each software state log comprising software state information associated with its originating user computer system, the software state information comprising identifications of applications executing on the originating user computer system other than the application with a potential software defect;

storing, by the defect repository server, the received software state logs in a defect repository;

analyzing, by the defect repository server, the software state information of the stored software state logs to detect patterns in the software state information across the plurality of originating user computer systems, the detected patterns comprising an indication that interaction between a first application and a second, other application is causing a potential software defect;

generating, by the defect repository server, one or more defect reports based on the detected pattern associated with the first application and the second, other application;

transmitting, by the defect repository server, a defect report to a computer system associated with the first application; and transmitting, by the defect repository server, a defect report to a computer system associated with the second, other application.

2. The method of claim 1, further comprising:

verifying by the defect repository server, that a potential software defect associated with a software state log is a defect, the software state log being received from an originating user computer system; and transmitting, by the defect repository server, a verification of the software defect to its originating user computer system.

3. The method of claim 1, wherein receiving the plurality of software state logs comprises receiving the plurality of software state logs from a plurality of originating user computer systems.

4. The method of claim 1, wherein the software state information comprises one or more of a trace of operating system (OS) system calls prior to an occurrence of a potential software defect, an input log of input/output (I/O) of a user computer system prior to an occurrence of the potential software defect, operating system information, user settings, user preferences, or application information.

5. The method of claim 1, wherein analyzing the software state information of the stored software state logs to detect patterns in the software state information comprises sorting the software state information based on application.

6. The method of claim 1, wherein the detected patterns in the software state information comprise a pattern of operating system (OS) system calls.

7. The method of claim 1, wherein the detected patterns in the software state information comprise an input/output (I/O) pattern in the operating system (OS).

8. A machine-accessible medium of a storage device containing instructions effective, when executing in a data processing system, to cause said data processing system to perform operations comprising:

receiving from a plurality of originating user computer systems a plurality of software state logs each from an originating user computer system, each software state log being associated with a potential software defect of an application executing on a user computer system, and each software state log comprising software state information associated with its associated user computer system, the software state information comprising identifications of applications executing on the originating user computer system other than the application with a potential software defect;

storing the received software state logs in a defect repository;

analyzing the software state information of the stored software state logs to detect patterns in the software state information across the plurality of originating user computer systems, the detected patterns comprising an indication that interaction between a first application and a second, other application is causing a potential software defect;

generating a defect report based on the detected pattern associated with the first application and the second, other application;

transmitting the defect report to a computer system associated with the first application; and transmitting the defect report to a computer system associated with the second, other application.

9. The machine-accessible medium of claim 8, further comprising:

verifying that a potential software defect associated with a software state log is a defect, the software state log being received from an originating user computer system; and transmitting a verification of the software defect to its originating user computer system.

10. The machine-accessible medium of claim 8, wherein the software state information comprises one or more of a trace of operating system (OS) system calls prior to an occurrence of a potential software defect, an input log of input/output (I/O) of a user computer system prior to an occurrence of the potential software defect, operating system information, user settings, user preferences, or application information.

11. The machine-accessible medium of claim 8, wherein analyzing the software state information of the stored software state logs to detect patterns in the software state information comprises sorting the software state information based on application.

12. A defect repository server system having one or more processors, the system comprising:

a communications module executing on or more processors to receive a plurality of software state logs from a plurality of originating user computer systems, each software state log being associated with a potential software defect of an application executing on its originating user computer systems, wherein each software state log comprises software state information associated with its originating user computer system, the software state information comprising identifications of applications executing on the originating user computer system other than the application with a potential software defect;

a defect repository interface executing on or more processors, the defect repository interface being adapted to store the received software state logs in a defect repository;

a defect analyzer module executing on or more processors, the defect analyzer module being adapted to analyze the software state logs stored in the defect repository to detect patterns in the software state information across the plurality of originating user computer systems, the detected patterns comprising an indication that interaction between a first application and a second, other application is causing a potential software defect; and a defect notification module executing on or more processors, the defect notification module being adapted to transmit an indication of the detected patterns in the software state information to a computer system associated with the first application and to a computer system associated with the second, other application.

13. The system of claim 12, wherein the defect notification module further comprises a defect verifier sub-module, the defect verifier sub-module being adapted to verify that a software defect associated with a software state log received from an originating user computer system is a defect.

14. The system of claim 13, wherein the defect notification module further comprises a user verification interface sub-module, the user verification interface sub-module being adapted to transmit a verification of the software defect to the originating user computer system.

15. The system of claim 12, wherein the defect notification module further comprises a third party defect interface sub-module, the third party defect interface sub-module being adapted to transmit a defect report, the detect report comprising an indication of a detected pattern associated with a particular application.

16. The system of claim 12, wherein the software state information comprises one or more of a trace of an operating system prior to an occurrence of a potential software defect, an input log of input/output (I/O) of a user computer system prior to an occurrence of the potential software defect, operating system information, application version information, user settings, user preferences, or application information.

17. The system of claim 12, wherein the detected patterns in the software state information comprise a pattern of operating system (OS) system calls.

18. The system of claim 12, wherein the detected patterns in the software state information comprise an input/output (I/O) pattern in the operating system (OS).

* * * * *